(12) United States Patent
Miyoshi

(10) Patent No.: US 7,681,702 B2
(45) Date of Patent: Mar. 23, 2010

(54) BAG WITH CASTER WHEELS

(75) Inventor: Etsuo Miyoshi, Higashikagawa (JP)

(73) Assignee: Swany Corporation, Kagawa (JP)

( * ) Notice: Subject to any disclaimer, the term of this patent is extended or adjusted under 35 U.S.C. 154(b) by 931 days.

(21) Appl. No.: 11/028,073

(22) Filed: Jan. 4, 2005

(65) Prior Publication Data

US 2005/0144755 A1    Jul. 7, 2005

(51) Int. Cl.
B60B 33/00    (2006.01)
A45C 5/14    (2006.01)

(52) U.S. Cl. .............. 190/18 A; 16/20; 16/22; 16/29; 16/18 R

(58) Field of Classification Search ........... 190/115, 190/18 A; 16/18 R, 20, 22, 29
See application file for complete search history.

(56) References Cited

U.S. PATENT DOCUMENTS

| | | | | |
|---|---|---|---|---|
| 1,576,923 | A * | 3/1926 | Malloy ............... | 16/20 |
| 3,818,541 | A * | 6/1974 | Daniels ............... | 16/18 A |
| 4,054,964 | A * | 10/1977 | Kaneko ............... | 16/20 |
| 5,097,565 | A * | 3/1992 | Shorey ............... | 16/48 |
| 5,330,037 | A | 7/1994 | Wang | |
| 5,908,093 | A * | 6/1999 | Miyoshi ............... | 190/115 |
| 5,950,779 | A | 9/1999 | Miyoshi | |
| 6,047,439 | A * | 4/2000 | Stearn ............... | 16/30 |
| 6,588,059 | B1 * | 7/2003 | McCord ............... | 16/30 |

FOREIGN PATENT DOCUMENTS

| | | |
|---|---|---|
| CN | 1181912 | 5/1998 |
| DE | 29 43 697 | 5/1981 |
| DE | 43 00 204 | 7/1993 |
| DE | 196 43 121 | 4/1998 |
| GB | 2 201 335 | 9/1988 |
| GB | 2 240 266 | 7/1991 |
| GB | 2 263 397 | 7/1993 |
| GB | 2 318 973 | 5/1998 |
| JP | 4-53721 | 8/1992 |
| JP | 4-212601 | 8/1992 |
| JP | 5-246204 | 9/1993 |
| JP | 10-137022 | 5/1998 |
| JP | 10-304920 | 11/1998 |
| JP | 11-91306 | 4/1999 |
| JP | 11-123904 | 5/1999 |
| JP | 2002-347408 | 12/2002 |
| JP | 2003-159905 | 6/2003 |
| JP | 2003-191705 | 7/2003 |

* cited by examiner

*Primary Examiner*—Tri M Mai
(74) *Attorney, Agent, or Firm*—Wenderoth, Lind & Ponack, L.L.P.

(57) ABSTRACT

A main bag (3) stands independently and moves via free swiveling caster wheels 1 at four corners. A free swiveling caster wheel (1) is provided with a wheel (6), a yoke (7) connected to the wheel in a manner allowing the wheel to rotate, a radial bearing (8) with its outer ring (8B) connected to the yoke, a swivel shaft (9) connected to the inner ring (8A) of the radial bearing, and a mount (10) which holds the upper end of the swivel shaft fixed. The rotation axis (11) of the wheel is disposed with eccentricity with respect to the swivel axis (m), which is the center of rotation of the swivel shaft, allowing the yoke to swivel. The yoke and mount have a bend prevention gap (15) established between mutually opposing surfaces in close proximity. When a bending impact load acts on the swivel shaft, the yoke and mount press against each other at the bend prevention gap to support the bending impact force.

13 Claims, 7 Drawing Sheets

BAG WITH CASTER WHEELS

BACKGROUND OF THE INVENTION

This invention relates to a bag with free swiveling caster wheels provided in the four corner regions of the bottom of the bag, and in particular to a bag that can move in any direction in a horizontal plane while standing independently on freely rotating caster wheels.

The present inventor has developed a bag which can stand independently and is free to move in any direction. This bag has free swiveling caster wheels mounted on the bottom surface of the main bag. Free swiveling caster wheels are provided at the four corners of the bottom surface of the main bag to allow it to stand on its own in a vertical position. A handle for moving the bag extends upwards and is connected to the main bag. A bag of this configuration can move freely in any direction while in a vertical standing position. A bag, which is moveable in this position, can be readily moved in crowded areas. In addition, it has the feature that it can be moved while being used as a supporting cane. Further, since the four caster wheels are free to move in any direction, the bag can freely move in any direction while standing in a vertical position. A vertically standing bag does not apply any of its weight to the handle. Therefore, even an extremely heavy bag can be easily moved simply by pushing.

In a bag with this structure, standing can become unstable when the lateral width of the bag is narrowed. Since free swiveling caster wheel direction naturally changes according to the direction of bag movement, instability can result from inconsistency in the movement direction. For example, when a bag is moved sideways in the direction shown by arrow A in FIG. 1, the bag can fall in the direction of movement as shown by arrow B. This is because caster wheels 41 on both sides of the bag face in the same direction, and the center of support for caster wheels 41 on both sides shifts from the center of the main bag 43. Further, if the main bag 43 is moved left and right as shown in FIG. 2, caster wheels 41 on both sides of the bag can face opposite directions, and the distance between wheels 46 can become narrower. In this case, the main bag can more easily fall to either side.

This drawback can be eliminated by making the main bag wider. However, if the main bag is made wider, it will become large, heavy, and inconvenient to use. It is necessary to design main bag width at sizes that are convenient for user application. If main bag width is increased to make it less likely to fall over, drawbacks, such as limited applications, arise.

Bag stability can also be improved by reducing the eccentricity of the free swiveling caster wheels. As shown in FIG. 1, an eccentricity distance (S) is established between the rotation axis 47 of the wheel 46 and the swivel shaft 49 of a free swiveling caster 41. The eccentricity distance (S) is the distance between the swivel axis m, which is the center of rotation of the swivel shaft 49, and a point where a horizontal plane is tangent to the wheel 46. It is necessary to provide a free swiveling caster wheel with a certain eccentricity distance (S). This is because the direction of a free swiveling caster wheel 41 should change automatically with movement of the main bag 43. As shown in FIG. 1, when the bag is moved in the direction of arrow A, each free swiveling caster wheel 41 swivels to position the point where the wheel 46 touches the ground, behind the swivel axis m, which is the center of rotation of the swivel shaft 49. By swiveling in this direction, the free swiveling caster wheels 41 allow the bag to move smoothly in any direction. If the eccentricity distance (S) is reduced, the swiveling ability of the caster will decrease and the caster will become unstable. Therefore, a certain eccentricity distance (S) is required for a free swiveling caster wheel. Although it is not illustrated, an example of a prior art free swiveling caster wheel had a yoke, which rotated in a horizontal plane, and a mount, which attached to the bottom of the main bag. This prior art configuration joined the yoke to the mount via steel balls and guide grooves to allow the yoke to swivel. In this free swiveling caster wheel structure, friction between the steel balls and rotation guide grooves prevented yoke rotation with light force, and it was necessary to increase the eccentricity distance (S) for swiveling. Further, because some play was required between the steel balls and rotation guide grooves, this caster wheel configuration had the drawback that loud noise would result when the bag was moved at night on a poorly paved walkway.

The eccentricity distance (S) of a free swiveling caster wheel can be shortened if the yoke can swivel with extremely small force, that is, if the yoke can smoothly rotate around the swivel shaft. A free swiveling caster wheel provided with a radial bearing has been developed to reduce rotational torque on the swivel shaft (refer to Japanese Patent Application Disclosure 2002-347408; and Japanese Patent Application Disclosure 2003-191705).

The free swiveling caster wheel cited in the disclosure of JP 2002-347408 has a radial bearing connected to the swivel shaft. The swivel shaft inserts into the inner ring of the radial bearing and the yoke is connected with the outer ring to allow the yoke, with wheel attached, to smoothly swivel via the bearing. In addition to allowing smooth swiveling, this caster wheel configuration has the characteristic that almost no noise is made even when moving on an uneven surface because there is almost no play in the ball bearings. However, if an impact load acts on the bag, bending stress will be applied to the swivel shaft of this free swiveling caster wheel. This is because an eccentricity distance (S) is established between the swivel shaft and the rotation axis of the wheel. This bending stress can be the cause of damage to the radial bearing. Since the radial bearing is designed to support forces perpendicular to its rotation axis, it does not have sufficient strength with respect to bending stresses. Consequently, if a strong impact load acts on the bag and strong bending stress is applied to a caster wheel, damage to rolling surfaces of the steel ball bearings, inner ring, and outer ring can occur in the radial bearing, and the caster will not rotate smoothly or can generate noise when rotating.

The free swiveling caster wheel cited in the disclosure of JP 2003-191705 has two radial bearings stacked top and bottom, and the yoke is sandwiched between the two radial bearings. In this caster wheel configuration, bending stresses are supported by two radial bearings. Consequently, this configuration is stronger with respect to bending stresses than that of JP 2002-347408. However, when two radial bearings are used, the drawback arises that manufacturing cost increases significantly. Further, since strong bending impact forces are being supported by radial bearings designed to support forces perpendicular to their rotation axes, it is difficult to insure sufficient strength in all cases, even when two bearings are stacked together. Bending impact forces cannot be eliminated because the bag can travel on surfaces with bumps and ruts, and because it can be dropped and receive a strong impact. Consequently, this free swiveling caster wheel has the drawback that even though radial bearings are used on the swivel shaft, swiveling becomes rough after a certain period of use.

The present invention was developed to further resolve the drawbacks described above. Thus it is a primary object of the present invention to provide a bag with caster wheels wherein even if strong impact forces act on the main bag, free swiveling caster damage is remarkably rare, casters can swivel extremely smoothly, and the bag can freely move in any direction without applying a large amount of force.

Another important object of the present invention is to provide a bag with caster wheels wherein the eccentricity distance of the free swiveling caster wheels is reduced to allow the bag to stand on its own, in a stable fashion even when main bag width is reduced.

The above and further objects and features of the invention will be more fully apparent from the following detailed description with the accompanying drawings.

SUMMARY OF THE INVENTION

The bag with caster wheels of the present invention is provided with a main bag with free swiveling caster wheels at the four corners of the bottom of the bag, which are able to move freely in any direction, and a handle which extends upward from the main bag. The bag can be moved freely in any direction via the handle while the main bag stands independently on the free swiveling caster wheels at its four corners. A free swiveling caster wheel is provided with a wheel, a yoke connected to the wheel in a manner allowing the wheel to rotate, a radial bearing with its outer ring connected to the yoke, a swivel shaft connected to the inner ring of the radial bearing, and a mount fixed to the upper end of the swivel shaft and attached to the bottom surface of the main bag. The swivel shaft is disposed vertically and the wheel rotation axis is positioned with eccentricity from the swivel axis m, which is the center of rotation of the swivel shaft. This allows the yoke to swivel when the main bag is moved. Further, the yoke and mount are provided with bend prevention gaps where the yoke and mount are opposed in mutual proximity at positions separated in the radial direction from the swivel axis m of the swivel shaft. When the main bag is acted on by an impact load and bending impact force is applied to the swivel shaft, the yoke and mount apply pressure on each other at the bend prevention gaps to support the bending impact force.

This bag has the characteristic that free swiveling caster damage is remarkably rare even when strong impact force is applied to the main bag, casters can swivel extremely smoothly, and the bag can move freely in any direction without being forced. This is because each caster is provided with bend prevention gaps between the yoke and mount at positions separated in the radial direction from the axis of rotation of the yoke. When an impact load on the main bag acts on the swivel shaft and bending stress is applied, the yoke and mount come in direct contact at bend prevention gaps, or the yoke and mount contact via a slip ring disposed between the yoke and mount. As a result, bending impact force is supported by pressure between the yoke and mount.

In addition, since the bag described above connects each yoke via a radial bearing in a manner allowing the yoke to rotate easily while preventing radial bearing damage, each free swiveling caster wheel can swivel smoothly while reducing caster wheel eccentricity. In a free swiveling caster with small eccentricity, change in position of the contact point between the wheel and the ground is reduced when caster direction is changed. Therefore, wheel position of casters mounted on both sides of the main bag does not shift significantly, and the main bag can stand on its own in a stable fashion. This realizes the characteristic that main bag width can be reduced and the distance between free swiveling caster wheels can be narrowed while allowing the bag to stand on its own in a stable manner.

The radial bearing can be a sealed bearing wherein the open region between the inner ring and the outer ring is closed off with seal material.

A bend prevention gap can be established between the top surface of the yoke and the bottom surface of the mount of a free swiveling caster wheel. A skirt can be provided on the mount to cover the outer perimeter of the yoke, and a bend prevention gap can be established between the inside surface of the skirt and the outer perimeter of the yoke.

The width of a bend prevention gap can be 0.1 mm to 1 mm for an unloaded main bag standing independently on a horizontal platform.

The yoke and mount can be made of metal or hard plastic.

In the bag with caster wheels of the present invention, a slip ring can be provided in the bend prevention gap. When an impact load is applied to the main bag, the yoke and mount can apply pressure on each other via the slip ring. The slip ring can be made of plastic sheet.

Further, in the bag with caster wheels of the present invention, when an impact load is applied to the main bag, the yoke and mount can make direct contact and apply pressure on each other.

DETAILED DESCRIPTION OF THE INVENTION

Figure 1:
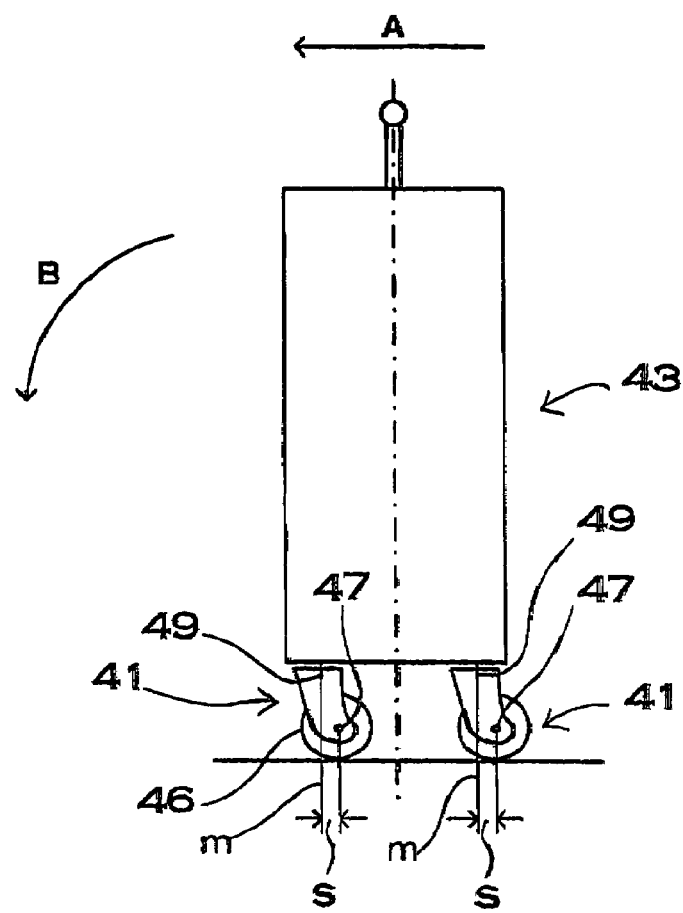
FIG. 1 is a side view showing an example of prior art bag instability.
Figure 2:
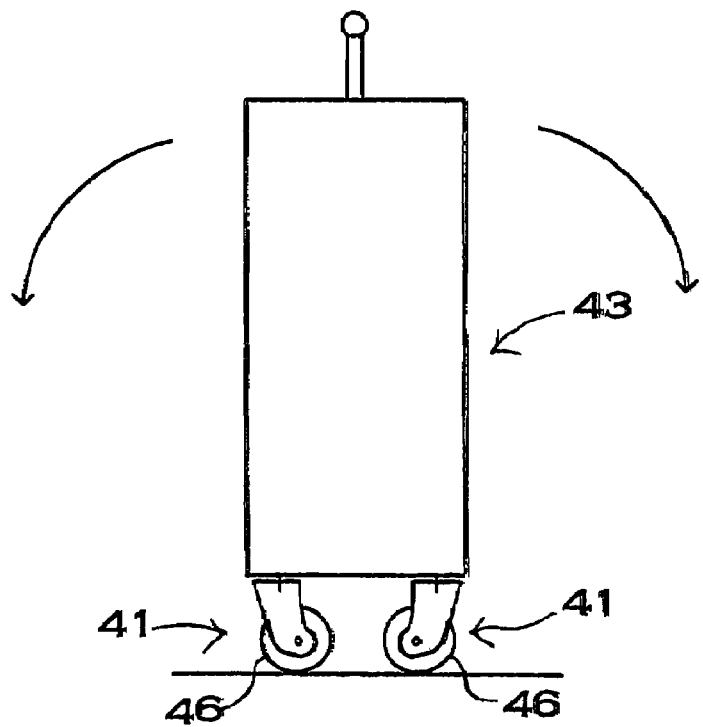
FIG. 2 is a side view showing another example of prior art bag instability.
Figure 3:
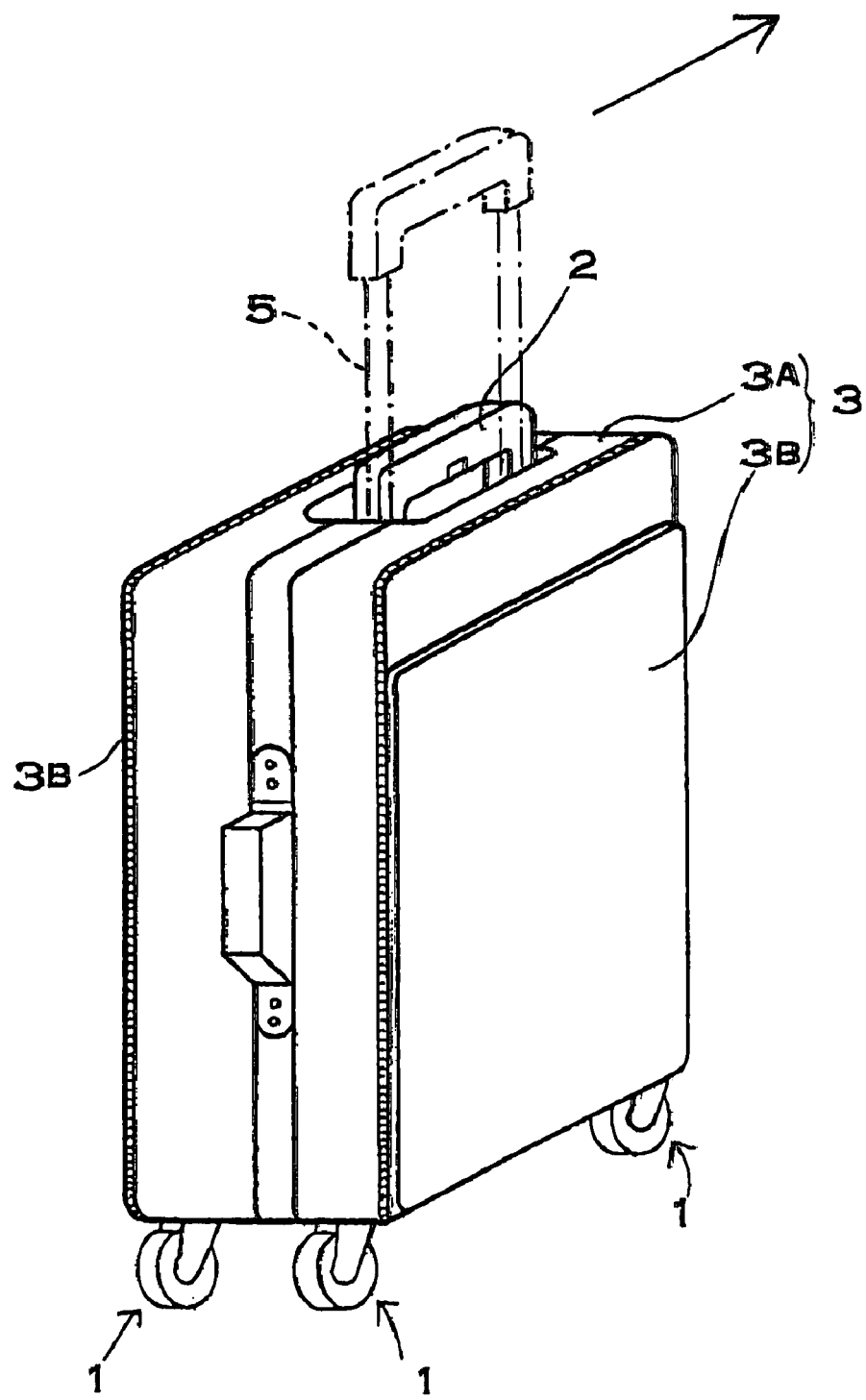
FIG. 3 is a perspective view of one embodiment of the bag of the present invention.
Figure 4:
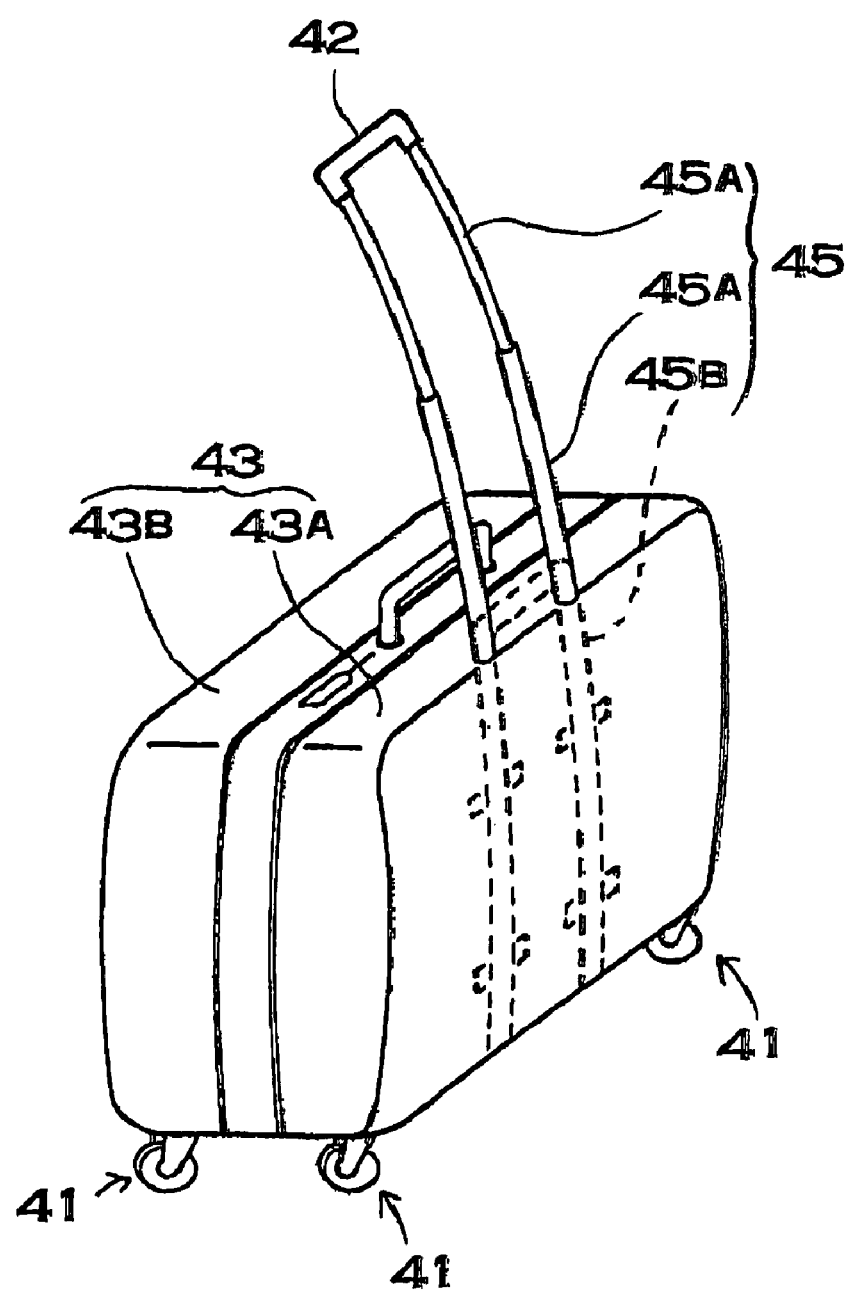
FIG. 4 is a perspective view of another embodiment of the bag of the present invention.
Figure 5:
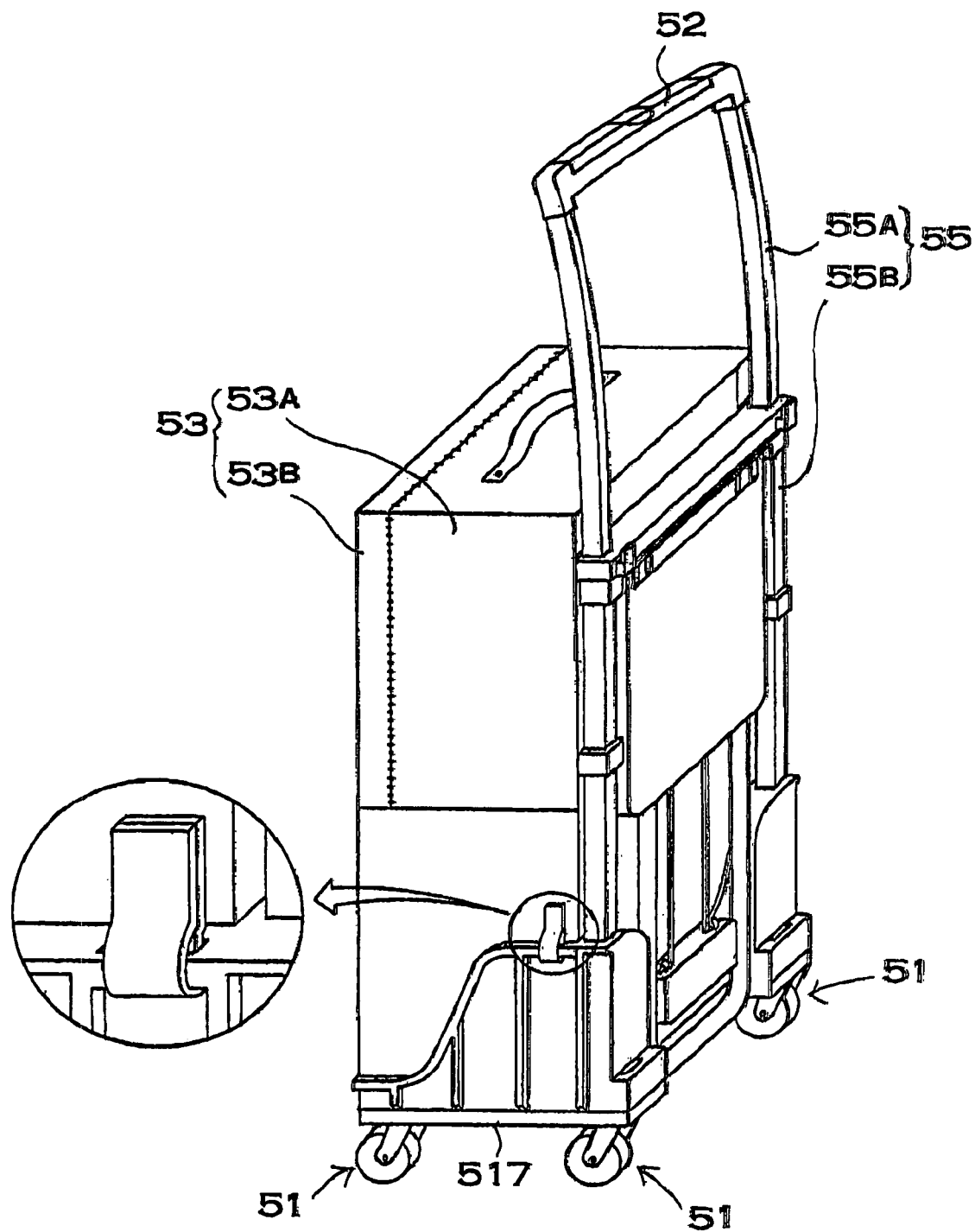
FIG. 5 is a perspective view of still another embodiment of the bag of the present invention.

The bags shown in FIGS. 3-5 are provided with a main bag 3, 43, 53 with free swiveling caster wheels 1, 41, 51 that can roll freely in any direction and are located at the four corners of the bottom surface of the bag, and a handle 2, 42, 52 that extends from the top of the main bag 3, 43, 53. This bag can move freely in any direction by pushing or pulling on the handle 2, 42, 52 while the main bag 3, 43, 53 stands independently on the free swiveling caster wheels 1, 41, 51 at the four corners of the bag.

The main bag 3, 43, 53 is made up of a main section 3A, 43A, 53A and a cover section 3B, 43B, 53B. The cover section 3B, 43B, 53B is connected to the main section 3A, 43A, 53A in a manner that allows it to open and close. A main bag 3, 43, 53 comprising a main section 3A, 43A, 53A and a cover section 3B, 43B, 53B can be made from hard material of sufficient strength. For example, the main bag 3, 43, 53 can be made of hard plastic such as ABS resin, formed by hardening fiber material joined in binder, made by applying coating material to water resistant hard paper, or manufactured from metal such as aluminum. The main bag 3, 43, 53 can also be made from soft material such as a flexible sheet material.

Reinforcing frame material can be disposed inside a main bag 3, 43, 53 made from flexible sheet material to retain its shape.

As shown in FIG. 3, the main bag 3 can be configured with cover sections 3B, which can open and close, on both sides, or as shown in FIG. 4, it can also be configured to open up from a center section. Further, as shown in FIG. 5, the main bag 53 can also be configured to allow attachment to, and detachment from a stand 517 with free swiveling caster wheels 51 attached.

When the bag is moved via the free swiveling caster wheels 1, 41, 51, the handle 2, 42, 52 is extended from the bag. When the bag is not being moved, the handle 2, 42, 52 is pushed into the bag. The handle 2, 42, 52 is connected to the bag via telescopic rods 5, 45, 55 in a manner allowing it to extend and retract. As shown in FIG. 3, the handle 2 can be disposed at the center of the upper surface of the main bag 3. As shown in FIGS. 4 and 5, the handle 42, 52 can also be disposed on one side of the main bag 43, 53 (on the right side in the figures) and move from one side towards the center as the handle 42, 52 is pulled upward. In the case where the telescopic rods 45, 55 are attached to one side of the main bag 43, 53, the center of the main bag 43, 53 means the center with respect to the left and right sides of the bag. Since the telescopic rods 45, 55 are attached to one side of the main bag 43, 53 in FIGS. 4 and 5, the telescopic rods 45, 55 are curved to move the handle 42, 52 from the side towards the center of the main bag 43, 53 as the telescopic rods 45, 55 are extended upwards. Namely, the middle of the telescopic rods 45, 55 bows outward to move the extended handle 42, 52 from the side of the main bag 43, 53 towards the center. However, although not illustrated, the telescopic rods can also be attached at an incline to one side of the main bag allowing the handle to move during extension from one side of the main bag towards the center without curving the telescopic rods. It is not necessary for the handle 42, 52 to be positioned exactly at the center of the main bag 43, 53 when the telescopic rods 45, 55 are extended. This is because, the handle 42, 52 can be pushed to move the bag forward without turning even if the handle 42, 52 is not positioned exactly at the center of the main bag 43, 53. In the figures, assuming the telescopic rod attachment side of the main bag 3, 43, 53 to be a reference 0% and the opposite side of the bag to be 100%, the extended handle 2, 42, 52 is positioned, for example, 15% to 80% of the way across the main bag 3, 43, 53, preferably 20% to 60% of the way across the main bag 3, 43, 53, and more preferably 20% to 50% of the way across the main bag 3, 43, 53.

When the telescopic rods 5, 45, 55 are retracted, namely when the handle 2, 42, 52 is pushed down as far as possible, the handle is restrained by a stopper (not illustrated) at a position at the top or above the main bag 3, 43, 53. With the telescopic rods 5, 45, 55 retracted and the handle 2, 42, 52 pushed down as far as possible, the distance from the bottom of the main bag 3, 43, 53, where caster wheels are attached, to the top of the handle 2, 42, 52 is approximately 50 cm. However, with the telescopic rods 5, 45, 55 retracted and the handle 2, 42, 52 pushed down as far as possible, the distance from the bottom of the main bag 3, 43, 53 to the top of the handle 2, 42, 52 can be 30 cm to 80 cm, and more preferably 35 cm to 70 cm. To allow the handle 2, 42, 52 to be easily gripped, the main bag 3, 43, 53 is made lower than the handle 2, 42, 52 with the telescopic rods 5, 45, 55 retracted and the handle 2, 42, 52 pushed down as far as possible. When the telescopic rods 5, 45, 55 are extended and the handle 2, 42, 52 is pulled up as high as possible, the handle 2, 42, 52 is restrained by a stopper in at a height of 60 cm to 100 cm from the bottom of the main bag to the center of the handle 2, 42, 52, and preferably in at a height 65 cm to 85 cm from the bottom of the main bag to the center of the handle 2, 42, 52.

The telescopic rods 5, 45, 55 are provided with guide cylinders 5B, 45B, 55B disposed vertically, and extension rods 5A, 45A, 55A which are inserted in the guide cylinders 5B, 45B, 55B in a manner allowing extension and retraction. The handle 2, 42, 52 is attached to the upper ends of the extension rods 5A, 45A, 55A. The guide cylinders 5B, 45B, 55B are mounted in the center of the main bag 3 shown in FIG. 3, on one side of the main bag 43 shown in FIG. 4, and on the stand 517 to one side of the main bag 53 shown in FIG. 5. The guide cylinders 5B, 45B, 55B and extension rods 5A, 45A, 55A can be made from metal cylinders of different size. However, the guide cylinders and extension rods can also be manufactured from plastic formed as rectangular cylinders.

Figure 6:
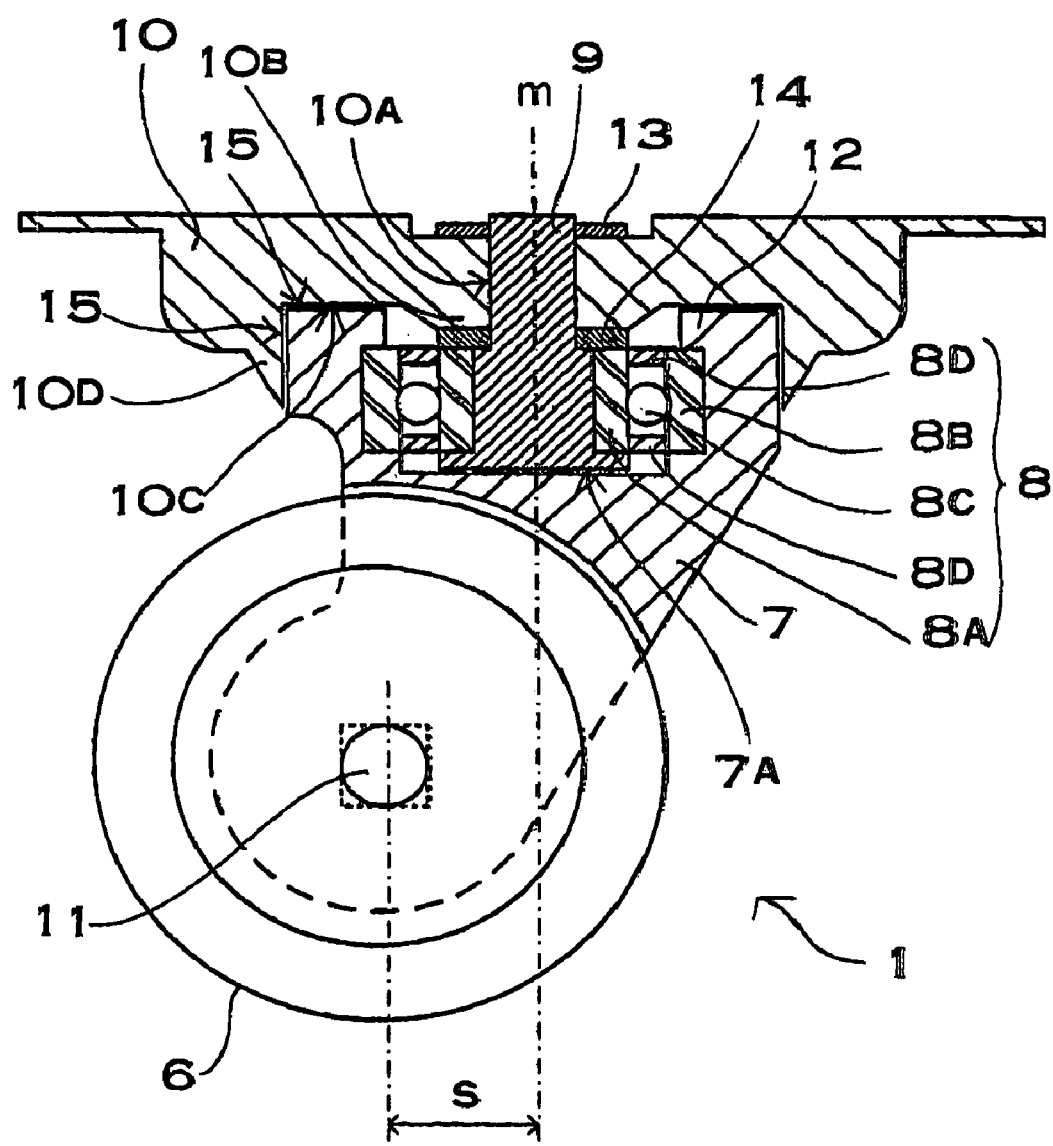
FIG. 6 is an enlarged cross-sectional view showing an example of a free swiveling caster wheel.

A cross-sectional view of a free swiveling caster wheel 1 is shown in FIG. 6. The free swiveling caster wheel 1 of FIG. 6 is provided with a wheel 6, a yoke 7 connected to the wheel 6 in a manner allowing the wheel 6 to rotate, a radial bearing 8 with its outer ring 8B connected to the yoke 7, a swivel shaft 9 connected to the inner ring 8A of the radial bearing 8, and a mount 10 attached with the upper end of the swivel shaft 9 and to the bottom surface of the main bag 3.

A wheel 6 is manufactured either entirely, or only its outer periphery, from natural rubber or plastic which can deform to some degree. A wheel 6, with a plastic or natural rubber outer periphery, has its inner region manufactured from a metal such as aluminum, or formed from hard plastic. The outer diameter of a wheel 6 is preferably 45 mm. However, wheel outer diameter can be 40 mm to 75 mm. Further, a wheel can have a circular cylinder made of low frictional drag plastic such as a fluorine based resin, and a rotation axis can be inserted into the circular cylinder in a manner allowing rotation. The rotation axis 11 has its ends attached to the yoke 7, and the rotation axis connects the wheel 6 to the yoke 7 in a manner allowing rotation.

The yoke 7 is made of metal or hard plastic, holds the rotation axis 11 of the wheel 6 at its lower end, and is provided with a circular cavity 7A that opens its upper end to accept the radial bearing 8. The radial bearing 8, connected with the swivel shaft 9 at its center, is inserted and fixed inside the circular cavity 7A. Therefore, the center of the circular cavity 7A is coincident with the swivel axis m, which is the center of rotation of the swivel shaft 9. The circular cavity 7A is established in the yoke 7 to provide eccentricity between the swivel axis m of the swivel shaft 9 and the rotation axis 11 of the wheel 6. The circular cavity 7A is established in the yoke 7 to make the eccentricity distance (S) between the swivel axis m and the rotation axis 11 equal to 12 mm. However, since the optimum value of the eccentricity distance (S) varies with main bag size, it can be, for example, 10 mm to 20 mm, preferably 11 mm to 18 mm, and more preferably 12 mm to 16 mm. A bag with small caster wheel eccentricity distance (S) can prevent main bag instability resulting from caster wheel orientation. However, if eccentricity distance (S) is too small, free swiveling caster wheels can fail to swivel smoothly when the main bag is moved in a horizontal plane. Consequently, eccentricity distance (S) is set to an optimum value within the previously mentioned ranges considering wheel size and main bag size.

The rotation axis 11 is attached to the lower end of the yoke 7 in a horizontal disposition, and the wheel 6 is connected to the rotation axis 11 in a manner allowing rotation. In addition, the radial bearing 8, with the swivel shaft 9 oriented vertically, is inserted and fixed in the circular cavity 7A provided at the upper end of the yoke 7. The outer ring 8B of the radial bearing 8 is attached with no gaps to the inside of the circular cavity 7A by pressure fitting, or the outer ring 8B is attached by bonding to the inner walls of the circular cavity 7A. A circular cavity 7A, with the outer ring 8B attached by pressure fitting, has an inner diameter made very slightly smaller than the outer diameter of the outer ring 8B. The outer ring 8B is forced into the smaller circular cavity 7A while flexibly opening the circular cavity 7A. The circular cavity 7A flexibly contracts with the outer ring 8B fit inside to apply pressure on the outer ring 8B and hold it fixed in a manner which cannot be pulled out.

The circular cavity 7A of the figure is provided with a stopper 12 to prevent the outer ring 8B from being pulled out. The stopper 12 projects out from the inside of the cavity to prevent extraction of the outer ring 8B of the radial bearing 8. The stopper 12 is widened during insertion of the outer ring 8B into the circular cavity 7A, and the outer ring 8B is passed by the stopper 12 into the circular cavity 7A. In the yoke 7 of the figure, a stopper 12 is provided which is configured as a single piece with the yoke 7. However, a retainer ring (not illustrated) that attaches to the mouth of the circular cavity of the yoke can also prevent the outer ring from being pulled out. The inside diameter of a retainer ring is made smaller than the outside diameter of the outer ring and larger than the outside diameter of the inner ring, and is configured to attach to the yoke by a means such as screws, bond, or pressure fitting.

Figure 8:
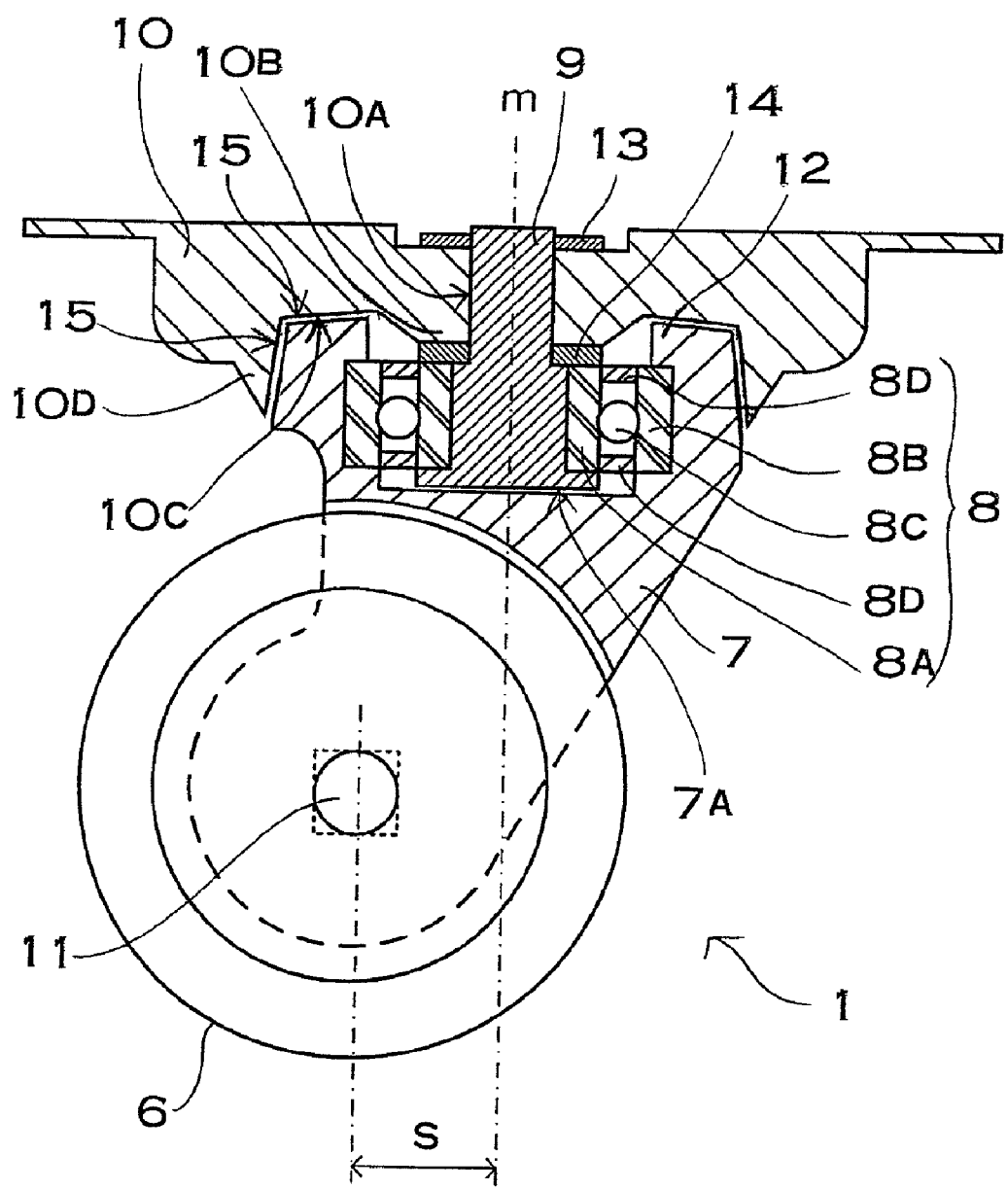
FIG. 8 is an enlarged cross-sectional view showing a modified example of the free swiveling caster wheel shown in FIG. 6.

The upper part of the yoke 7 has a circular cylindrical shape, the top surface of the yoke 7 is a horizontal plane, and the outer perimeter of the yoke 7 takes the form of a circular column. However, as shown in FIG. 8, the top surface of the yoke 7 can also be inclined from its outer perimeter towards the center. In addition, the outer perimeter of the yoke can be a tapered surface with an increasing outer diameter from the top surface towards the bottom (see FIG. 8).

The radial bearing 8 has steel ball bearings or rollers disposed between its inner ring 8A and outer ring 8B. Since a radial bearing with steel ball bearings has excellent resistance to axially directed loads, it is a suitable radial bearing for this application. The radial bearing 8 has an outside diameter of 24 mm and a width of 8 mm. However, radial bearings with an outside diameter of 20 mm to 30 mm can be used. The outer ring 8B of the radial bearing is connected to the yoke 7, and the inner ring 8A is connected to the swivel shaft 9 to connect the yoke 7 to the swivel shaft 9 in a manner allowing the yoke 7 to rotate smoothly about the swivel shaft 9.

The radial bearing 8 is a sealed bearing with seal material 8D closing off the open region between the inner ring 8A and outer ring 8B. Seal material 8D is attached on one side to either the inner ring 8A or the outer ring 8B, and slides along the unattached side to prevent ingress of foreign objects between the inner ring 8A and outer ring 8B. Seal material 8D is sheet metal, synthetic resin sheet, or rubber-like flexible material. The inside perimeter or the outside perimeter of the seal material 8D is attached to the inner ring 8A or the outer ring 8B. Seal material 8D, with its inside perimeter attached to the outside perimeter of the inner ring 8A, has its outside perimeter able to slide in close proximity to the inside perimeter of the outer ring 8B, or has its outside perimeter able to slide in contact with the inside perimeter of the outer ring 8B. Seal material 8D, with its outside perimeter attached to the inside perimeter of the outer ring 8B, has its inside perimeter able to slide in close proximity to the outside perimeter of the inner ring 8A, or has its inside perimeter able to slide in contact with the outside perimeter of the inner ring 8A. Since seal material 8D which is synthetic resin or rubber-like flexible material can slide in contact with the outer perimeter of the inner ring 8A or the inner perimeter of the outer ring 8B, it can more reliably prevent ingress of foreign objects such as dust.

The swivel shaft 9 is a metal rod with its lower end connected to the inner ring 8A of the radial bearing 8 and its upper end attached in a perpendicular fashion to the mount 10. The swivel shaft 9 is attached to the mount 10 in a manner that does not allow rotation. The swivel shaft 9 of the figure has a collar 13 at its upper end, and mates with the inner ring 8A at its lower end to connect to the radial bearing 8 and yoke 7. The swivel shaft can also be mated and joined to the mount at its upper end. In this configuration, the swivel shaft can solidly connect the inner ring and mount without play. Further, a collar can be provided at one end and an e-ring or the like can be inserted at the other end for connecting the mount and inner ring. In this case, a groove in the direction of the swivel shaft circumference is provided at one end for e-ring insertion.

The mount 10 is attached to the bottom surface of the main bag 3 by screws, or the mount is formed as a single piece with a base-plate and the base-plate attaches to the bottom of the main bag 3. The mount 10 has a through hole 10A at its center which accepts the swivel shaft 9 in a perpendicular orientation. The swivel shaft 9 is inserted into the through hole 10A to fix the swivel shaft 9 to the mount 10 in a perpendicular disposition.

The mount 10 holds the inner ring 8A of the radial bearing 8 in a stationary fashion via the swivel shaft 9. The mount 10 of the figure is provided with a projecting region 10B around the through hole 10A for contact with the inner ring 8A. A spacer 14 is sandwiched between the projecting region 10B and the inner ring 8A. The spacer is sheet metal or hard plastic sheet. In the free swiveling caster wheel 1 of this figure, a spacer 14 is disposed between the projecting region 10B and the inner ring 8A, but the projecting region may also directly contact the inner ring for attachment without a spacer.

The mount 10 has a bottom surface 10C opposite the top surface of the yoke 7. In addition, the mount 10 of the figure has a skirt 10D that covers the upper region of the outside perimeter of the yoke 7. The circular cylindrical inside surface of the skirt 10D is in close proximity to the circular cylindrical outside surface of the yoke 7.

The free swiveling caster wheel 1 of the figure is provided with a bend prevention gap 15 between the mount 10 and yoke 7, where they are in close proximity. This bend prevention gap 15 is located in the radial direction separated from the swivel axis m of the swivel shaft 9, and is a gap between surfaces in close proximity. The free swiveling caster wheel 1 is provided with a bend prevention gap 15 between the top surface of the yoke 7 and the bottom surface 10C of the mount 10. A bend prevention gap 15 can also be established between the circular cylindrical outside surface of the yoke 7 and the circular cylindrical inside surface of the skirt 10D. Further, bend prevention gaps 15 can also be established between both the top surface of the yoke 7 and the bottom surface 10C of the mount 10, and between the circular cylindrical outside surface of the yoke 7 and the circular cylindrical inside surface of the skirt 10D.

When an impact load acts on the main bag 3 and bending impact force is applied to the swivel shaft 9, the mount 10, swivel shaft 9, and yoke 7 can bend or distort, or the relative position of other parts connected to those components can change due to play in connecting regions. The bend prevention gap 15 is a gap which closes when such an impact force is applied, and it is set, for example, at 0.7 mm to 0.8 mm. However, since the bend prevention gap 15 is set according to the material and tolerances of the mount 10, swivel shaft 9, and yoke 7, it can be set at 0.1 mm to 1 mm. If the bend prevention gap 15 is too narrow, the yoke 7 and mount 10 will come in contact with a small load applied to the main bag 3, and the caster will not be able to swivel smoothly. To the contrary, if the bend prevention gap 15 is too wide, the yoke 7 and mount 10 will come in contact only when an extremely large impact load is applied to the main bag 3. In this case, the bend prevention gap 15 has little capability to absorb an impact load, and the radial bearing 8 can be easily damaged by an impact load. Consequently, the bend prevention gap 15 is ideally set for contact between the yoke 7 and mount 10 when a vertically applied impact load is more than 50% to 200% of the load resistance of the radial bearing 8.

In the free swiveling caster wheel 1 of the figure, the width of the bend prevention gap 15 can be adjusted to an optimum value via the spacer 14 sandwiched between the projecting region 10B of the mount 10 and the inner ring 8A. This is because the width of the bend prevention gap 15 can be adjusted by the thickness of the spacer 14. The bend prevention gap 15 can be made wider by inserting a thick spacer 14, and made narrower by inserting a thin spacer 14. In addition, resiliently deforming plastic sheet or metal plate can be used as the spacer 14 to allow it to become thinner when a strong impact load acts on the main bag 3. In a free swiveling caster wheel 1 using this type of spacer 14, the bend prevention gap 15 becomes narrower when a strong impact load is applied. Consequently, when an impact load is applied, the mount 10 and yoke 7 make contact at the bend prevention gap 15, and excessive load is prevented from acting on the radial bearing 8. Therefore, damage to the radial bearing 8 due to strong impact loads can be effectively prevented.

Figure 7:
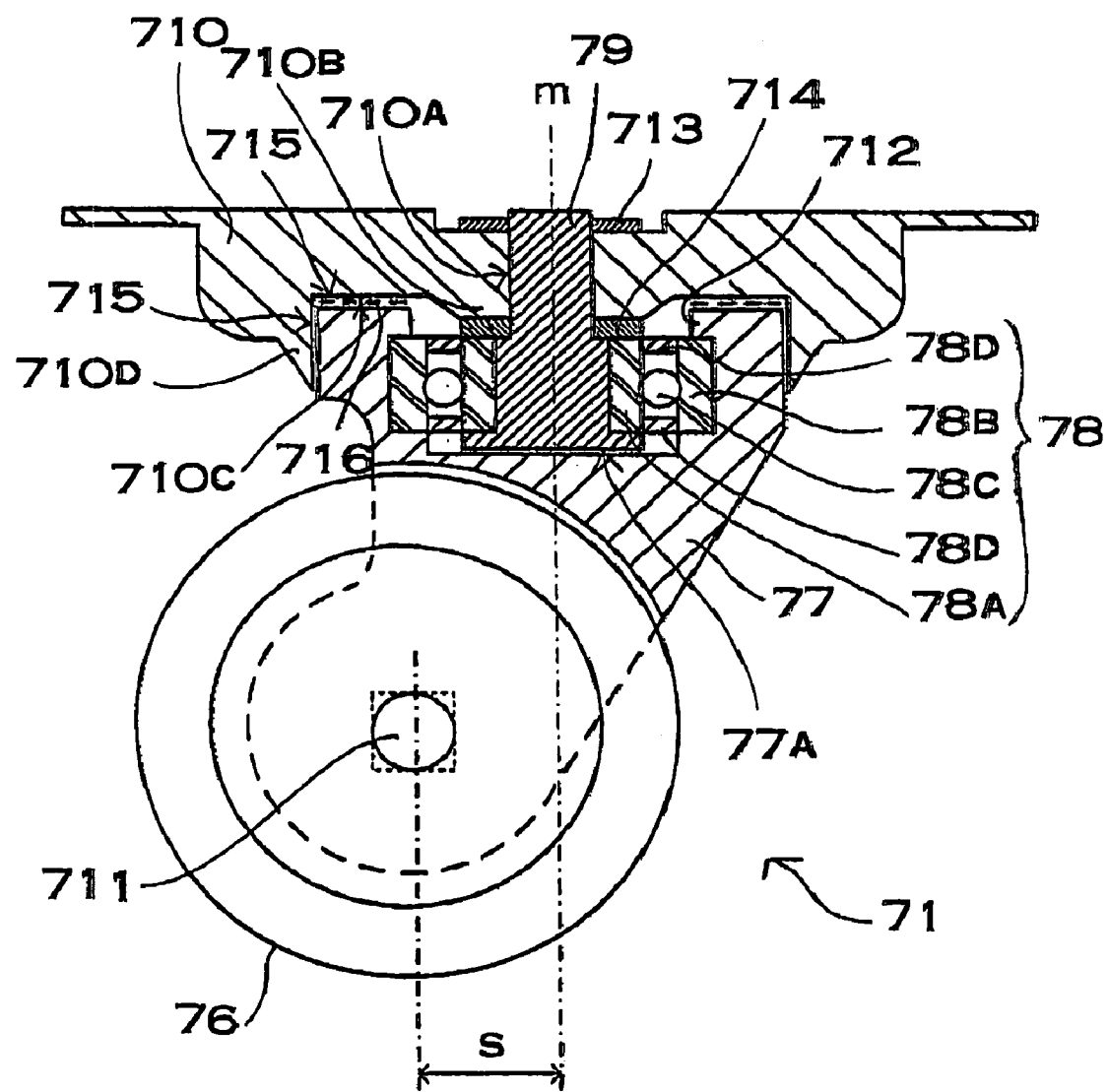
FIG. 7 is an enlarged cross-sectional view showing another example of a free swiveling caster wheel.

In the free swiveling caster wheel 1 of FIG. 6, when an impact load is applied to the main bag 3, the mount 10 and yoke 7 come in direct contact at the bend prevention gap 15 to prevent excessive load from acting on the radial bearing 8. In the free swiveling caster wheel 71 of FIG. 7, a slip ring 716 is disposed in the bend prevention gap 715. The slip ring 716 is a circular disk shape and is positioned between the top surface of the yoke 77 and the bottom surface 710C of the mount 710. The outside diameter of the slip ring 716 is approximately equal to the outside diameter of the top surface of the yoke 77 or the inside diameter of the bottom surface 710C of the mount 710, and the inside diameter of the slip ring 716 is approximately equal to the inside diameter of the top surface of the circular cylindrical yoke 77. The slip ring 716 is plastic sheet material such as fluorine based resin or polyethylene resin which has low sliding resistance while contacting the mount 710 and yoke 77. When no impact load acts on the vertically standing main bag 73, little pressure is applied on the slip ring 716 by the mount 710 and yoke 77, and the yoke 77 swivels smoothly with little frictional resistance. When an impact load acts on the main bag 73 and the bend prevention gap 715 narrows, pressure is applied on the slip ring 716 from the top surface of the yoke 77 and the bottom surface 710C of the mount 710. In this condition, the yoke 77 and mount 710 contact through the slip ring 716, and the yoke 77 and mount 710 press against each other via the slip ring 716 to support the bending impact force. In this configuration of free swiveling caster wheel 71, since the slip ring 716 is used as a shock absorbing material, impact loads applied to the main bag 73 are absorbed by the slip ring 716 and bending impact forces can be supported. In this embodiment, the same constituent parts as in the previous embodiment are denoted by the same reference numeral regarding the last digits except for the first digit and their descriptions are abbreviated.

As this invention may be embodied in several forms without departing from the spirit or the essential characteristics thereof, the present embodiment is therefore illustrative and not restrictive, since the scope of the invention is defined by the appended claims rather than by the description preceding them, and all changes that fall within the metes and bounds of the claims or the equivalence of such metes and bounds thereof are therefore intended to be embraced by the claims.

This application is based on application No. 2004-001488 filed in Japan on Jan. 6, 2004, the content of which is incorporated hereinto by reference.

What is claimed is:

1. A bag comprising:

a main bag;

a plurality of free swiveling caster wheels that are free to swivel in any direction, the caster wheels being attached at four corners of a bottom surface of the main bag; and a handle provided so as to be extendable in an upward direction from the main bag, wherein the main bag, standing independently on the free swiveling caster wheels at the four corners, can be moved freely in any direction via the handle, wherein each of the free swiveling caster wheels is provided with a wheel that is rotatable about a rotation axis, a yoke connected to the wheel so as to allow the wheel to rotate, a vertically oriented swivel shaft defining a swivel axis, and a mounting member holding an upper end of the swivel shaft, said mounting member being attached to a bottom surface of the main bag, wherein the rotation axis of the wheel is eccentrically disposed with respect to a central axis of the swivel shaft, and the yoke can swivel about the swivel shaft when the main bag is moved, wherein each of the free swiveling caster wheels is further provided with a radial bearing having an outer ring connected to the yoke, and an inner ring connected to the swivel shaft, wherein a first bend prevention gap is formed between an upper surface of the yoke and a lower surface of the mounting member, and the yoke and the mounting member are opposed in mutual proximity at a location that is separated in a radial direction from the swivel axis of the swivel shaft, wherein the mounting member has a projecting region that projects toward the inner ring, and a spacer is interposed between the projecting region and the inner ring so as to permit adjustment of a width of the first bend prevention gap, wherein the yoke defines a cylindrical cavity that is open at an upper end thereof and closed at a lower end thereof, the radial bearing being received and fixed in the cylindrical cavity, wherein the swivel shaft is inserted through a center of the radial bearing so that the radial bearing is pivotally connected to the swivel shaft, wherein an outer perimeter of the upper part of the yoke forms a cylindrical column, wherein the mounting member has a skirt that substantially covers the cylindrical column of the yoke, and a second bend prevention gap is formed between an inner surface of the skirt and the outer perimeter of the yoke, such that, when a bending impact force acts on the swivel shaft, due to an impact load applied to the main bag, the yoke and the mounting member apply pressure on each other at the first bend prevention gap and the second bend prevention gap to support the bending impact force, and wherein the radial bearing is a sealed bearing with seal material that closes off an open region between the inner ring and the outer ring.

2. A bag as recited in claim 1, wherein the handle is disposed at a central portion of the upper surface of the main bag.

3. A bag as recited in claim 1, wherein the handle is disposed at one side of the main bag and is movable from the side towards a position over a central portion of the upper surface of the main bag as it is pulled up.

4. A bag as recited in claim 1, wherein at least an outer peripheral region of each of the wheels is made of plastic which can deform or natural rubber, and a center region is formed of metal or hard plastic.

5. A bag as recited in claim 1, wherein the rotation axis of each of the wheels is spaced from the swivel axis of the swivel shaft by a distance of 10 mm to 20 mm.

6. A bag recited in claim 1, wherein an upper surface of the yoke defines a horizontal plane.

7. A bag as recited in claim 1, wherein the bend prevention gap has a width of 0.1 mm to 1 mm when the main bag is in an unloaded condition and is standing independently on a horizontal platform.

8. A bag as recited in claim 1, wherein the yoke is formed of metal or hard plastic.

9. A bag as recited in claim 1, wherein the mount is formed of metal or hard plastic.

10. A bag as recited in claim 1, wherein the slip ring is formed of a plastic sheet material.

11. A bag as recited in claim 1, wherein the yoke and the mount make direct contact and apply pressure on each other when a sufficient impact load is applied to the main bag.

12. A bag as recited in claim 1, wherein the spacer is made of resiliently deformable material.

13. A bag comprising:
a main bag;
a plurality of free swiveling caster wheels that are free to swivel in any direction, the caster wheels being attached at four corners of a bottom surface of the main bag; and
a handle provided so as to be extendable in an upward direction from the main bag, wherein the main bag, standing independently on the free swiveling caster wheels at the four corners, can be moved freely in any direction via the handle;
wherein each of the free swiveling caster wheels is provided with a wheel that is rotatable about a rotation axis, a yoke connected to the wheel so as to allow the wheel to rotate, a vertically oriented swivel shaft defining a swivel axis, and a mounting member holding an upper end of the swivel shaft, said mounting member being attached to a bottom surface of the main bag, wherein:
the rotation axis of the wheel is eccentrically disposed with respect to a central axis of the swivel shaft, and the yoke can swivel about the swivel shaft when the main bag is moved;
each of the free swiveling caster wheels is further provided with a radial bearing having an outer ring connected to the yoke, and an inner ring connected to the swivel shaft;
a first bend prevention gap is formed between an upper surface of the yoke and a lower surface of the mounting member, and the yoke and the mounting member are opposed in mutual proximity at a location that is separated in a radial direction from the swivel axis of the swivel shaft;
the yoke defines a cylindrical cavity that is open at an upper end thereof and closed at a lower end thereof to receive the radial bearing, and an outer perimeter of the upper part of the yoke forms a circular cylindrical column;
the radial bearing is inserted into and fixed inside of the cylindrical cavity, and the radial bearing is pivotally connected at its center to the swivel shaft;
the mounting member has a skirt that substantially covers the cylindrical column of the yoke, and a second bend prevention gap is formed between an inner surface of the skirt and the outer perimeter of the yoke, such that, when a bending impact force acts on the swivel shaft due to an impact load applied to the main bag, the yoke and the mounting member apply pressure on each other at the first bend prevention gap and the second bend prevention gap to support the bending impact force; and
the radial bearing is a sealed bearing with seal material that closes off an open region between the inner ring and the outer ring.

* * * * *